United States Patent
Pathan

(10) Patent No.: US 11,704,198 B2
(45) Date of Patent: Jul. 18, 2023

(54) METHOD AND APPARATUS FOR PROVIDING RECOVERY FROM A COMPUTING DEVICE BOOT UP ERROR

(71) Applicant: Advanced Micro Devices, Inc., Santa Clara, CA (US)

(72) Inventor: Mohammad Younas Khan Pathan, Chittoor (IN)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/215,136

(22) Filed: Mar. 29, 2021

(65) Prior Publication Data

US 2022/0308963 A1   Sep. 29, 2022

(51) Int. Cl.
*G06F 11/00* (2006.01)
*G06F 11/14* (2006.01)
*G06F 13/20* (2006.01)
*G06F 9/4401* (2018.01)

(52) U.S. Cl.
CPC ........ *G06F 11/1417* (2013.01); *G06F 9/4401* (2013.01); *G06F 13/20* (2013.01)

(58) Field of Classification Search
CPC ......................... G06F 11/1417; G06F 11/1469
USPC ........................................................ 714/1–57
See application file for complete search history.

(56) References Cited

U.S. PATENT DOCUMENTS

| | | | | |
|---|---|---|---|---|
| 10,817,378 | B2 * | 10/2020 | Suryanarayand | G06F 9/4406 |
| 2008/0155247 | A1 * | 6/2008 | Zimmer | G06F 12/1408 |
| | | | | 711/163 |
| 2009/0249120 | A1 * | 10/2009 | Yao | G06F 11/1417 |
| | | | | 714/15 |
| 2015/0089280 | A1 * | 3/2015 | Sade | G06F 11/0793 |
| | | | | 714/6.12 |
| 2016/0196195 | A1 * | 7/2016 | Chang | G06F 11/1438 |
| | | | | 714/6.3 |
| 2017/0199776 | A1 * | 7/2017 | Dasar | G06F 11/079 |
| 2018/0096154 | A1 * | 4/2018 | Sh | G06F 21/572 |
| 2018/0349607 | A1 * | 12/2018 | Khatri | G06F 21/575 |
| 2019/0163497 | A1 * | 5/2019 | Samuel | G06F 11/1469 |

* cited by examiner

*Primary Examiner* — Sarai E Butler

(57) ABSTRACT

A method and apparatus provide recovery from a computing device boot up error by detecting a current boot up error in the computing device, loading a plurality of recovery pre-EFI initialization modules (PEIMs), of a recovery unified extensible firmware interface (UEFI) BIOS for execution, wherein the recovery PEIMS include executable code to pre-initialize at least a processing unit and memory of the computing device in a pre-EFI initialization (PEI) phase of a multi-phase platform initialization operation, and recovering from the boot up error by booting up the computing device using the loaded plurality of recovery pre-EFI initialization modules.

20 Claims, 4 Drawing Sheets

METHOD AND APPARATUS FOR PROVIDING RECOVERY FROM A COMPUTING DEVICE BOOT UP ERROR

BACKGROUND OF THE DISCLOSURE

A unified extensible firmware interface (UEFI) and boot firmware, also referred to as UEFI BIOS, is a type of multi-phase platform booting firmware. The Unified Extensible Firmware Interface (UEFI) is an interface between the operating system (OS) and the platform firmware. The UEFI interface is in the form of data tables that contain platform-related information, and boot and runtime service calls that are available to the OS loader and the OS. Together, these provide a standard environment for booting an OS. The BIOS uses the UEFI interface to boot to an OS and is called as UEFI BIOS. Boot up operations that conform to the industry standard Unified Extensible Firmware Interface (UEFI) Platform Initialization (PI) Specification (incorporated by reference) use a pre-EFI Initialization (PEI) phase of the platform initialization that employs pre-EFI initialization code modules (PEIMs) that are referenced in firmware files and are used to initialize components is a computing platform.

Generally, the UEFI BIOS is the first software to run after turning on the computing device. A corrupted UEFI BIOS is one of the possible causes of a computing system being unable to complete power on self-test (POST) or boot into a system's operating system. The UEFI BIOS can be corrupted during normal operation, through environmental conditions such as a power surge or outage. Also, improper BIOS setting enablement by a user or during new features with unknown bugs can also cause a BIOS to be corrupted.

If a computing device such as a tablet, smart phone, laptop, desktop, server or other computing device supports BIOS recovery, in today's systems there is an option to flash the system firmware using a recovery BIOS from a hard disk or a USB drive. This option is widely used by users when system firmware is corrupted and unable to boot with a current UEFI BIOS present in the system, then the recovery UEFI BIOS (also referred to as a working UEFI BIOS) is used to recover the current BIOS. In the recovery process, a pre-EFI initialization (PEI) phase is executed from the current BIOS and the remaining phases of the UEFI process such as a driver execution environment (DXE) and boot dev select (BDS), are executed from the recovery BIOS. However, if the recovery UEFI BIOS has code changes in the PEI code which are not compatible with the PEI code of the current BIOS, the current BIOS PEI information is passed to the DXE phase of the recovery BIOS. This makes system features that may not be functional and may lead to a system crash.

BRIEF DESCRIPTION OF THE DRAWINGS

The implementations will be more readily understood in view of the following description when accompanied by the below figures, wherein like reference numerals represent like elements, and wherein.

Figure 1:
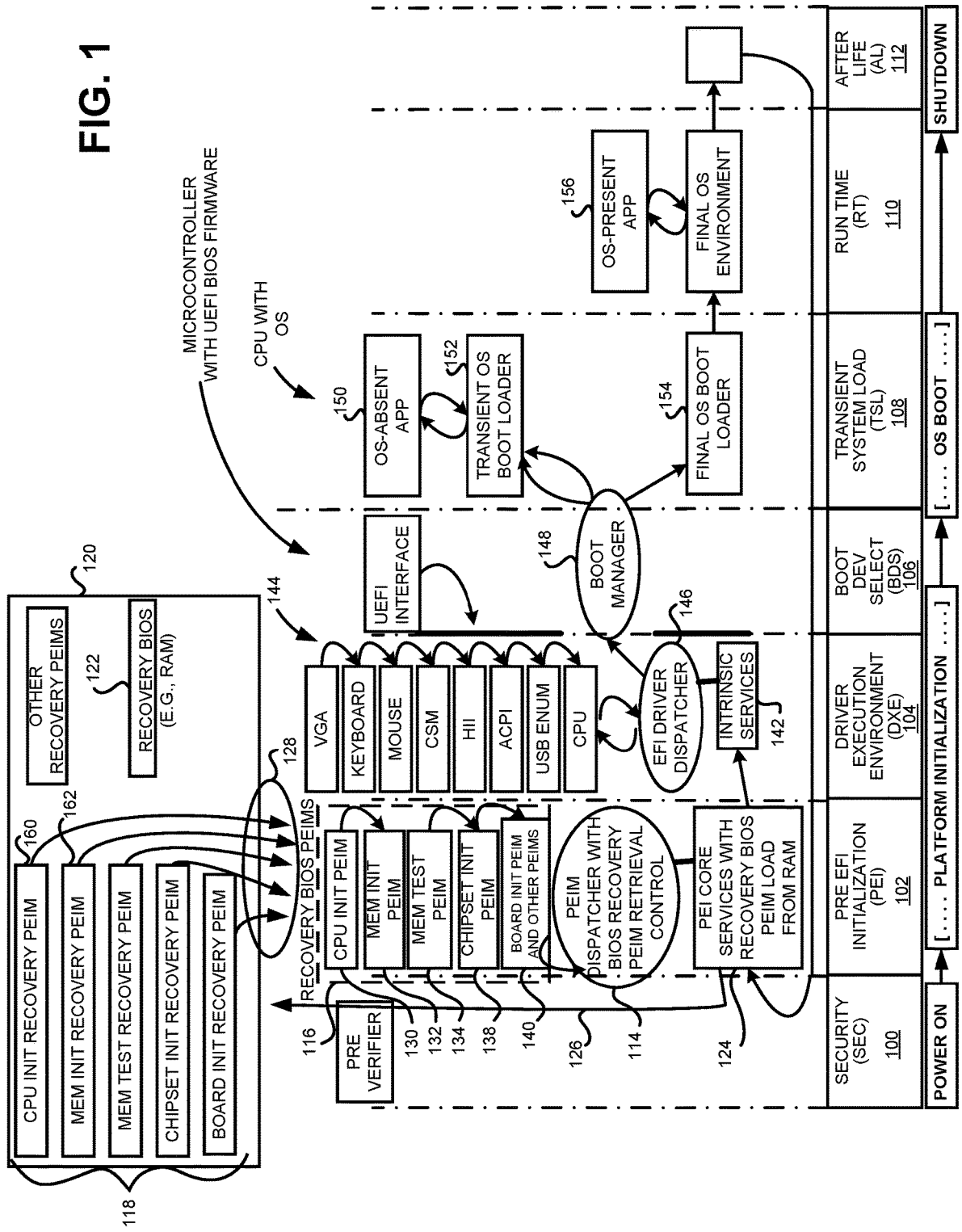
FIG. 1 is a block diagram illustrating a multi-phase platform initialization operation in accordance with one example set forth in the disclosure.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

A method and apparatus load pre-EFI initialization modules (PEIMs) from a recovery UEFI BIOS and the driver execution environment (DXE) is also executed from the recovery UEFI BIOS, instead of, for example, using current PEIMs in the currently booting UEFI BIOS. The method and apparatus avoid improper handoff from a pre-EFI initialization phase to a DXE phase while firmware recovery occurs from a current UEFI BIOS. In some implementations, the method and apparatus load and store a recovery UEFI BIOS in a temporary memory such as RAM and loads recovery PEIMs from the recovery UEFI BIOS stored in RAM during firmware recovery of a current UEFI BIOS. In one example, the current UEFI BIOS is stored in SPI flash memory and the recovery UEFI BIOS is the BIOS present in peripheral devices/network and loads into temporary memory and used for recovery. The method and apparatus reduce system malfunctions and crashes during firmware recovery in UEFI pre-boot environments and also enhances recovery processes by loading recovery PEIMs for the PEI phase from a recovery UEFI BIOS and in some implementations also run the DXE phase and subsequent phases from the recovery BIOS. As such, in some implementations, the method and apparatus allow recovery from a bootup error from a currently booting UEFI BIOS by booting up the computing device using the stored plurality of recovery PEIMs in a temporary memory, such as memory internal to the computing device, instead of using PEIMs in the currently booting BIOS.

In certain implementations, a method for providing recovery from a computing device boot up error includes detecting a current boot up error in a computing device, loading a plurality of recovery pre-EFI initialization modules (PEIMs), of a recovery unified extensible firmware interface (UEFI) BIOS for execution, wherein the recovery PEIMS include executable code to pre-initialize at least a processing unit and memory of the computing device in a pre-EFI initialization (PEI) phase of a multi-phase platform initialization operation, and recovering from the boot up error by booting up the computing device using the loaded plurality of recovery pre-EFI initialization modules.

In some examples, recovering from the boot up error includes executing a driver execution environment from the recovery UEFI BIOS that performs handoff with the PEI phase that executes the loaded recovery PEIMS. In certain examples, loading the plurality of recovery PEIMS including using a PEIM dispatcher of the current UEFI BIOS to call a PEI core service of the current UEFI BIOS to load the plurality of PEIMS from memory and execute the recovery PEIMS as part of the PEI phase.

In some examples, recovering from the boot up error includes performing post DXE boot phases from the recovery UEFI BIOS. In certain examples, the method includes detecting the current boot up error by determining by a current UEFI BIOS that a recovery triggering event has occurred, loading the recovery UEFI BIOS into volatile memory of the computing device in response to the recovery triggering event, and checking by the current UEFI BIOS that recovery PEIMS are present in the volatile memory prior to loading the a plurality of recovery PEIMS.

In some examples, a current BIOS will detect and execute until a recovery BIOS BDS phase and firmware causes the current BIOS to be overwritten with the recovery BIOS in an SPI flash device and restarts the system. The recovery BIOS will be the actual BIOS that executes and boots the OS. The current BIOS will not exist after firmware recovery and the recovery BIOS will boot the OS. In certain examples, the computing devices includes the volatile memory operatively coupled to the processor.

In certain implementations, a computing device for providing recovery from a boot up error includes non-volatile memory that includes a current UEFI BIOS, a processor, in operative communication with the non-volatile memory, the current UEFI BIOS includes executable instructions that causes the processor to detect a current boot up error with the UEFI BIOS, load a plurality of recovery pre-EFI initialization modules (PEIMs), of a recovery unified extensible firmware interface (UEFI) BIOS for execution, wherein the recovery PEIMS comprise executable code to pre-initialize at least a processing unit and memory of the computing device in a pre-EFI initialization (PEI) phase of a multi-phase platform initialization operation, and recover from the boot up error by booting up the computing device using the loaded plurality of recovery pre-EFI initialization modules.

In some examples, the processor recovers from the boot up error by executing a driver execution environment from the recovery UEFI BIOS that performs handoff with the PEI phase that executes the loaded recovery PEIMS.

In certain examples, the processor loads the plurality of recovery PEIMS using a PEIM dispatcher of the current UEFI BIOS to call a PEI core service of the current UEFI BIOS to load the plurality of PEIMS from volatile memory and execute the recovery PEIMS as part of the PEI phase. In some examples, the processor recovers from the boot up error by performing post DXE boot phases from the recovery UEFI BIOS.

In certain examples, the processor detects the current boot up error by determining by a current UEFI BIOS that a recovery triggering event has occurred, loads the recovery UEFI BIOS into volatile memory of the computing device in response to the recovery triggering event, and checks by the current UEFI BIOS that recovery PEIMS are present in the volatile memory prior to loading the a plurality of recovery PEIMS.

In some examples, a current BIOS will detect and execute until a recovery BIOS BDS phase and firmware causes the current BIOS to be overwritten with the recovery BIOS in an SPI flash device and restarts the system. The recovery BIOS will be the actual BIOS that executes and boots the OS. The current BIOS will not exist after firmware recovery and the recovery BIOS will boot the OS. In certain examples, the computing devices includes the volatile memory operatively coupled to the processor.

In some implementations, a non-transitory storage medium includes stored executable instructions therein that when executed by a processor, causes the processor to detect a current boot up error with the UEFI BIOS, load a plurality of recovery pre-EFI initialization modules (PEIMs), of a recovery unified extensible firmware interface (UEFI) BIOS for execution, wherein the recovery PEIMS comprise executable code to pre-initialize at least a processing unit and memory of the computing device in a pre-EFI initialization (PEI) phase of a multi-phase platform initialization operation, and recover from the boot up error by booting up the computing device using the loaded plurality of recovery pre-EFI initialization modules.

In certain examples, the stored executable instructions cause the processor to recover from the boot up error by executing a driver execution environment from the recovery UEFI BIOS that performs handoff with the PEI phase that executes the loaded recovery PEIMS.

In some examples, the stored executable instructions cause the processor to load the plurality of recovery PEIMS using a PEIM dispatcher of the current UEFI BIOS to call a PEI core service of the current UEFI BIOS to load the plurality of PEIMS from memory and execute the recovery PEIMS as part of the PEI phase.

In some examples, the stored executable instructions cause the processor to recover from the boot up error by performing post DXE boot phases from the recovery UEFI BIOS.

In certain examples, the stored executable instructions cause the processor to detect the current boot up error by determining by a current UEFI BIOS that a recovery triggering event has occurred, load the recovery UEFI BIOS into volatile memory of the computing device in response to the recovery triggering event, and check by the current UEFI BIOS that recovery PEIMs are present in the volatile memory prior to loading the a plurality of recovery PEIMs.

In some examples, the stored executable instructions comprise firmware configured to operate as the current UEFI BIOS. In certain examples, a current BIOS will detect and execute until a recovery BIOS BDS phase and firmware causes the current BIOS to be overwritten with the recovery BIOS in an SPI flash device and restarts the system. The recovery BIOS will be the actual BIOS that executes and boots the OS. The current BIOS will not exist after firmware recovery and the recovery BIOS will boot the OS. In certain examples, the computing devices includes the volatile memory operatively coupled to the processor.

FIG. 1 diagrammatically illustrates an example of a bootup flow carried out by a microcontroller executing UEFI BIOS firmware. Also shown is an operating system boot flow where the operating system being executed by a CPU is detected, loaded and executed to provide a runtime environment. In this example, the UEFI BIOS performs a multi-phase platform initialization operation such as phases defined by the UEFI Platform Initialization (PI) standard. However, any suitable multi-phase platform initialization operation may also be employed. In this example, the boot flow includes a security phase 100, pre-EFI initialization phase 102, driver execution environment phase 104 and a boot dev select phase 106. As shown, the multi-phase platform initialization operation in some examples includes a transient system load phase 108 followed by the runtime phase 110 where the operating system is executing applications and presents an operating system environment. When shutdown occurs as shown by after life (AL) phase 112, the computing device performs bootup operation after power up.

Unlike prior systems, the UEFI BIOS firmware operation illustrated in FIG. 1 includes code that provides a PEIM dispatcher 114 with UEFI BIOS recovery PEIM retrieval control and a PEI core service 124 with a recovery PEIM load operation. In some implementations, the PEIM dispatcher 114 detects a current bootup error in the computing device and instead of using initialization PEIMs of the current UEFI BIOS shown as PEIMs 116, loads recovery PEIMs 118 of a recovery UEFI BIOS 122 stored in memory 120, such as internal RAM to the computing device. The memory 120 in this example is volatile memory such as RAM, or any other suitable volatile memory.

In some implementations, the PEI code includes the PEI core services 124 that loads the recovery PEIMs 118 from memory 120 through, for example, a load operation 126 resulting in the recovery PEIMs 118 that are used as the PEIMs by the current UEFI BIOS. The loading of the recovery PEIMs from RAM is shown by arrows 128.

The various initialization PEIMs may be for any suitable component or operation and in this example there is a central processing unit initialization PEIM 130, a memory initialization PEIM 132, a memory test PEIM 134, a chip set initialization PEIM 138 and a board such as a mother board initialization PEIM 140 such that each PEIM which is a set of executable instructions, is used to initialize the respective components through, for example, the driver execution environment phase 104 as known in the art. For example, the recovery PEIMs include executable code to pre-initialize differing components within the computing device such as a processing unit through CPU initialization PEIM 132 and memory such as through memory initialization PEIM 132 as well as other components in the computing device.

In one example, the PEIM dispatcher 114 determines that the recovery BIOS 122 is present in the memory 120 and provides addresses of the recovery PEIMs 118 to the PEI core services 124 which in turn causes the recovery PEIMS 118 to be loaded and executed as part of the PEI phase. In certain examples, the addresses are provided by current BIOS PEIMS after the dispatcher detects/finds the recovery image in computing device volatile memory. In some examples, the PEIM dispatcher 114 calls the PEI core services 124 to load and execute the recovery PEIMS 118. The driver execution environment 104 is also executed from the recovery BIOS 122. The PEIM dispatcher 114 is from the current UEFI BIOS which loads recovery BIOS PEIMS 118 from addresses found. Because the DXE and recovery PEIMS are from the recovery BIOS 122, the PEI core services 124 provide data that is expected by the recovery DXE phase thereby eliminating malfunction occurrences that can occur in prior systems. This is because in conventional systems, the recovery BIOS reuses the current PEIMS and PEI core services of the current UEFI BIOS are used with a recovery DXE from the recovery UEFI BIOS, if the current PEIMS have differing code versions from the expected version of the recovery DXE, malfunctions have been determined to occur. In other implementations, the dispatcher code is from the recovery UEFI BIOS when the PEIM dispatcher can be loaded from the recovery UEFI BIOS in the security phase (SEC). For example, the PEIM dispatcher of recovery BIOS will load from recovery BIOS PEIMS (in RAM).

As such, in recovery mode, the current UEFI BIOS will execute and launch recovery BIOS PEIMS and the recovery BIOS DXE phase and in recovery BIOS BDS phase, the BIOS presents a user interface (UI) to select the recovery BIOS (if multiple recovery BIOS exists) or else selects default recovery BIOS and loads the recovery BIOS into the BIOS SPI flash device by overwriting the current BIOS, and restarts the system to boot the recovery BIOS from the BIOS flash device and then boots to the OS. Post completion of recovery, transient system load (TSL) phase 108, runtime phase 110 and AL phase 112 are used in a conventional manner.

During DXE phase the EFI driver dispatcher 146 calls a boot manager 148 when the driver execution environment is complete with its operation. The boot manager 148 attempts to boot the operating system as shown by blocks 150, 152, as known in the art and initiates the final operating system boot loader 154 to initiate the operating system boot. As shown by block 156, the operating system is considered present and applications are able to run as part of the final OS environment during runtime as shown by runtime phase 110. Power down can occur in the computing device which then reinitiates the multi-phase bootup operation.

Figure 2:
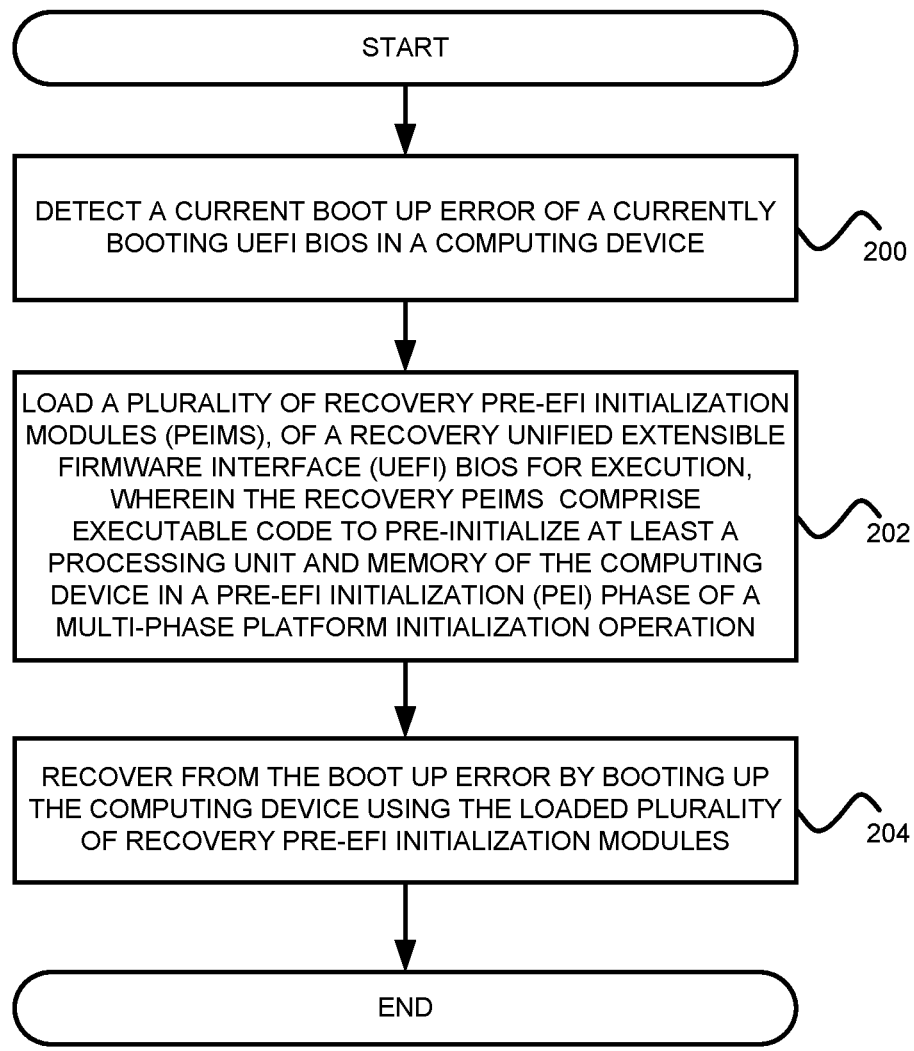
FIG. 2 is a flowchart illustrating a method for providing recovery from a computing device bootup error in accordance with one example set forth in the disclosure.

FIG. 2 illustrates one example of a method for providing recovery from a computing device bootup error as carried out, for example, by a microcontroller in the computing device that executes the improved PEI and DXE firmware. In this example, the firmware causes the microcontroller to load and use recovery PEIMs 118 that are part of a recovery UEFI BIOS stored in volatile memory, for example so that current PEIMs from the current BIOS are not used.

For example, as shown in block 200, the method includes detecting a current bootup error of the currently booting UEFI BIOS in a computing device. In one example, this is done by the PEIM dispatcher 114 which detects a recovery triggering event. For example, after the computing system is powered on, the current UEFI BIOS, namely the PEI phase 102, checks if a recovery is triggered. If a recovery triggering event is detected, as shown in block 202, the method includes loading a plurality of recovery PEIMs 118 of a recovery UEFI BIOS 122 from memory 120. The recovery PEIMs 118 include executable PEIM code modules to preinitialized multiple components of the computing device including, for example, processors and memory as illustrated by CPU recovery PEIM 160, and memory recovery PEIM 162 (and other recovery PEIMS as shown). In block 204, the method includes recovering from the bootup error by booting up the computing device using the loaded plurality of recovery PEIMS 118 instead of using PEIMS in the current booting BIOS. In one example, this is performed by the PEIM dispatcher 114 providing the addresses to the multiple recovery PEIMS 118 for the PEI core services 124. The PEI core service 124 retrieves the recovery PEIMS and cause the recovery PEIMS to be loaded for execution as part of the PEI phase. In other implementations the PEIM dispatcher retrieves and causes the recovery PEIMS to execute.

In certain implementations, the driver execution environment 104 is also executed from the recovery UEFI BIOS 122. The PEI phase performs initialization and sends hand-off blocks (HOBs) to the DXE environment through the PEI core service and intrinsic services code 124 and 142 respectively.

In some implementations, loading of the recovery PEIMS 118 includes using the PEIM dispatcher 114 of the current UEFI BIOS to call the PEI core service 124 of the current UEFI BIOS to load the plurality of recovery PEIMS 118 from memory 120 and execute the recovery PEIMS as part of the PEI phase 102.

Figure 3:
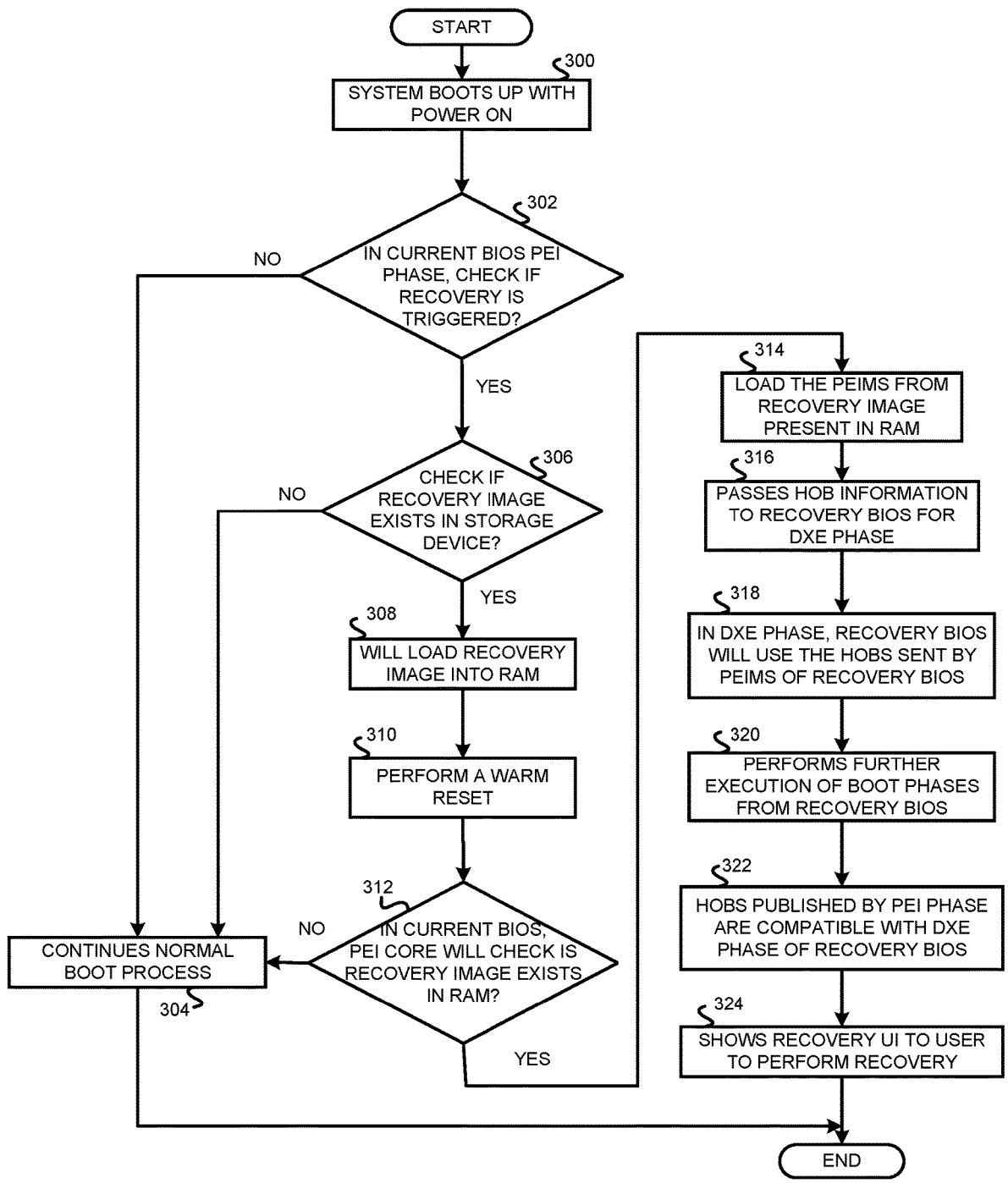
FIG. 3 is a flowchart illustrating a method for providing recovery from a computing device bootup error in accordance with one example set forth in the disclosure.
Figure 4:
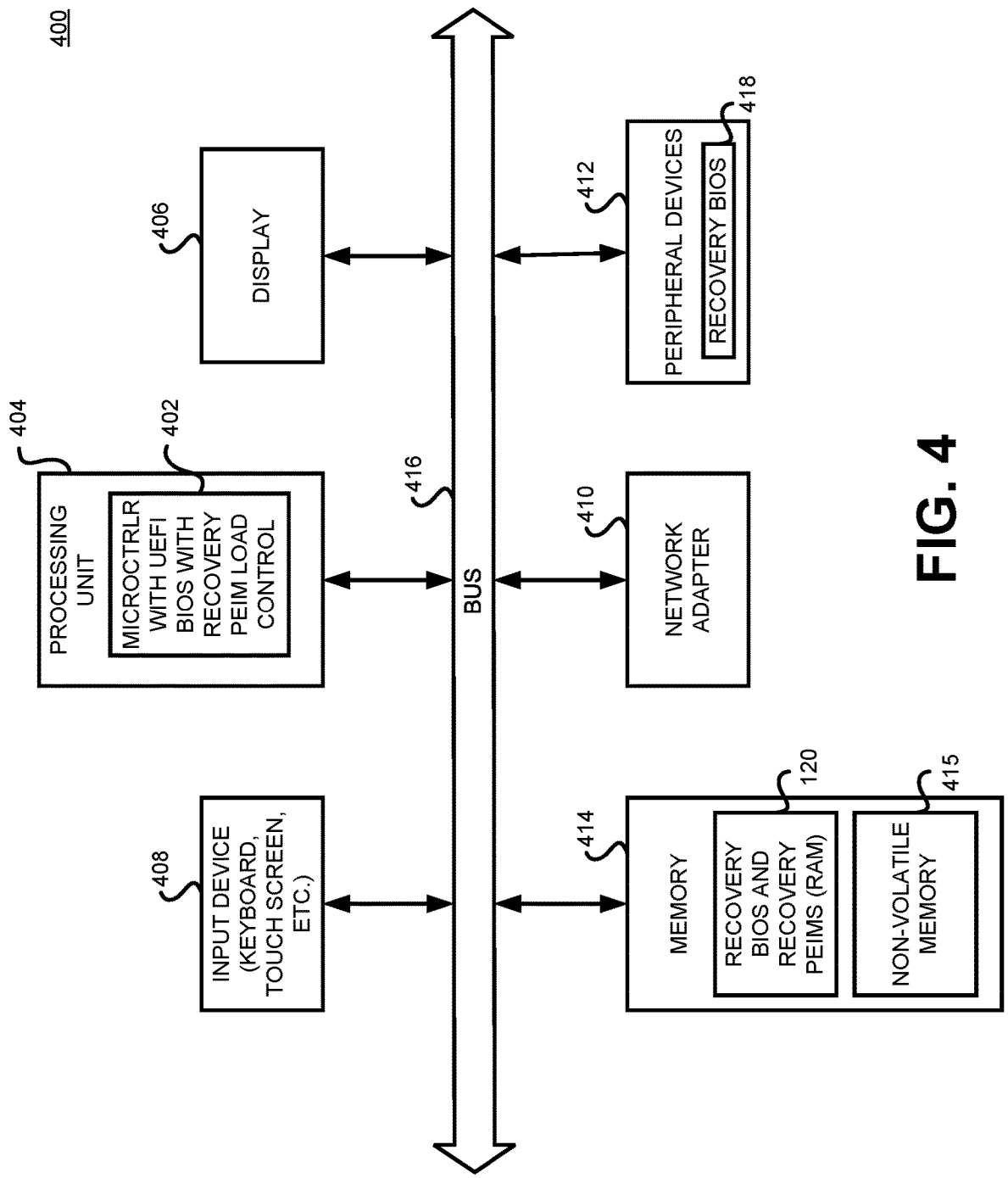
FIG. 4 illustrates one example of a computing device for providing recovery from a bootup error in accordance with one example set forth in the disclosure.

Referring to FIGS. 3 and 4, a method for providing recovery from a computing device bootup error is shown in more detail. As shown in block 300, the method includes powering on the computing system to begin system bootup from a current UEFI BIOS that is preloaded for example in flash ROM that is accessible to the microcontroller 402 (e.g., processor) (see FIG. 4) through a serial peripheral interface (SPI). The microcontroller 402 executes the current UEFI BIOS but when a boot up error occurs, the dispatcher and PEI core service of the current UEFI BIOS uses the recovery BIOS to provide recovery PEIMS to recover from the boot up error.

Block 302 illustrates that the microcontroller 402 executes the current BIOS PEI phase which checks if a recovery event has triggered and sets a recovery flag. For example, the PEIM dispatcher receives a trigger from a hot key on a keyboard pressed by a user. In other implementations a trigger is sent from a user changing a configuration setting in the BIOS to perform recovery or from any suitable triggering event. If no recovery event has been triggered, the method includes continuing a normal boot process as shown in block 304. However, if a current bootup error is detected, as shown in block 306, the method includes checking memory, such as a USB drive, hard drive (HDD), memory in a network or other storage medium. If a recovery UEFI BIOS image exists in the memory, then the recovery process is initiated based on user input/settings. For example, this is done by the dispatcher 114 in one example. If no recovery UEFI BIOS is detected, the method continues to a normal boot process as shown in block 304. For example, the recovery flag is cleared and the process continues to carry out the boot process using the current UEFI BIOS.

However, if the recovery UEFI BIOS is detected in USB memory, as shown in block 308, the method includes loading the recovery UEFI into volatile memory such as RAM. For example, if a recovery BIOS is detected in a USB thumb drive or HDD, the dispatcher loads the recovery UEFI BIOS into RAM. In some implementations, as shown in block 310, a warm reset is then performed which does not change the RAM memory contents but restarts the system. In other implementations no warm reset is performed. For example, the PEIM dispatcher will execute recovery BIOS PEIMs. But there will be some memory initializations done from the current BIOS PEIMs. To avoid the memory conflicts, a warm reset can be performed.

As shown in block 312, the method includes the current UEFI BIOS checking if the recovery image exists in RAM such as, for example, the PEI core service 124 checking the memory 120 to confirm that the recovery UEFI BIOS image is present. If the recovery UEFI BIOS image is not detected in the RAM, then the process continues a normal boot process as shown in block 304. However, if the PEI core services 124 (or PEIM dispatcher 114) checks and finds a recovery UEFI BIOS image in memory 120 then the method continues to block 314 where the PEIM dispatcher 114 provides the addresses of the recovery BIOS 122 and the recovery PEIMs to the PEI core service 124 which loads the recovery PEIMs 118 for execution.

As shown in block 316, the method includes passing handoff block (HOB) information to the recovery UEFI BIOS for the DXE phase execution that is executed from the recovery BIOS. As shown in block 318, in the DXE phase, the recovery BIOS uses the HOB sent by the recovery PEIMs of the recovery BIOS so that the DXE phase is also executed from the recovery BIOS. As shown in block 320, the method includes performing further execution of post-DXE boot phases from the recovery BIOS. As shown in block 322, the method includes publishing the handoff blocks by the PEI phase 102 which are compatible with the HOBs expected by the recovery BIOS. As such, the system will not hang or cause exceptions. As shown in block 324, the method includes presenting a recovery user interface to a user for example, through a display, so that the user can perform recovery items. For example, if multiple recovery BIOSs are present in the storage device like RecoveryBIOS1, RecoveryBIOS2 etc., the user is given an option to select which BIOS to perform recovery with, in the recovery UI. Or else the user selects the default recovery BIOS.

FIG. 4 illustrates one example of a computing device 400 such as, but not limited to, a tablet, laptop, server, desktop device, or any other suitable device that employs a UEFI BIOS. In this example, the computing device includes one or more processing units 404 such as one or more CPU cores and the CPU cores may be integrated on an integrated circuit that also includes one or more microcontrollers 402 that execute boot up firmware as described herein. The computing device 400, in some implementations, includes a display 406, input/output devices 408, network adapter 410, peripheral devices 412 and memory 414 that are interconnected through suitable interfaces represented as bus 416. The memory 414 in one example includes the volatile RAM that stores the recovery UEFI BIOS including the recovery PEIMS. The memory 414 block also represents memory 415 which is non-volatile memory such as flash ROM, EEPROM, NVRAM or any other suitable memory that stores the current UEFI BIOS. In some examples, the memory includes non-transitory memory and stores executable instructions such as firmware that causes a processor, such as a microcontroller to perform boot up and recovery operations as described herein. The peripheral devices 412 in one example can include a USB drive that includes the recovery UEFI BIOS 418 which is subsequently copied to the memory 120 as previously described.

In certain implementations, the computing device 400 provides recovery from a boot up error and includes non-volatile memory 415 that stores a current UEFI BIOS, a processor 402, in operative communication with the non-volatile memory 415. The current UEFI BIOS includes executable instructions that causes the processor 402 to detect a current boot up error with the UEFI BIOS, load a plurality of recovery pre-EFI initialization modules (PEIMS) 118, of a recovery unified extensible firmware interface (UEFI) BIOS for execution, wherein the recovery PEIMS 118 include executable code, such as PEIMS 160 and 162 to pre-initialize at least a processing unit 404 and memory, such as system memory of the computing device in a pre-EFI initialization (PEI) phase of a multi-phase platform initialization operation, and recover from the boot up error by booting up the computing device using the loaded plurality of recovery pre-EFI initialization modules 118.

In some examples, the processor 402 recovers from the boot up error by executing a driver execution environment 104 from the recovery UEFI BIOS 122 that performs handoff with the PEI phase 102 that executes the loaded recovery PEIMS. In certain examples, the processor 402 loads the plurality of recovery PEIMs using the PEIM dispatcher 114 of the current UEFI BIOS to call a PEI core service 124 of the current UEFI BIOS to load the plurality of PEIMs 118 from volatile memory 120 and execute the recovery PEIMs 118 as part of the PEI phase. In some examples, the processor recovers from the boot up error by performing post DXE boot phases such as BDS and TSL from the recovery UEFI BIOS after the current BIOS is overwritten with the recovery BIOS. For example, the current UEFI BIOS is configured to carry out the multi-phase platform initialization operations of a pre-EFI initialization (PEI) phase that employs recovery PEIMs and a driver execution environment (DXE) phase of a recovery UEFI BIOS and the firmware causes overwriting of the current UEFI BIOS in memory with the recovery BIOS and executes a boot dev select (BDS) operation and a transient system load (TSL) operation from the recovery UEFI BIOS to boot an operating system of the computing device.

In certain examples, the processor 402 detects the current boot up error by determining by a current UEFI BIOS, such as by the PEIM dispatcher 114, that a recovery triggering event has occurred. The processor 402 loads the recovery UEFI BIOS into volatile memory of the computing device in response to the recovery triggering event, such as by using the PEIM dispatcher 114 and the PEIM core services 124, and checks via the PEIM dispatcher of the current UEFI BIOS that recovery PEIMs are present in the volatile memory prior to loading the a plurality of recovery PEIMs.

In some examples, the current UEFI BIOS is configured to carry out the multi-phase platform initialization operations of a driver execution environment (DXE), a boot dev select (BDS) operation and a transient system load (TSL) operation from the recovery UEFI BIOS using the PEIM dispatcher 114 and PEI core services 124 of the current UEFI BIOS to boot an operating system of the computing device. In other implementations, PEI dispatcher or PEI core services are loaded from the recovery BIOS using the security phase of the current BIOS if addresses are known ahead of PEI phase.

As noted above, one or more of the memories 120 and/or 415 store executable instructions, such as firmware code, therein that when executed by a processor, causes the processor to detect a current boot up error with the UEFI BIOS, load a plurality of recovery pre-EFI initialization modules (PEIMs), of a recovery unified extensible firmware interface (UEFI) BIOS for execution, wherein the recovery PEIMS include executable code to pre-initialize at least a processing unit and memory of the computing device in a pre-EFI initialization (PEI) phase of a multi-phase platform initialization operation, and recover from the boot up error by booting up the computing device using the loaded plurality of recovery pre-EFI initialization modules instead of using corresponding PEIMs in the currently booting BIOS. In some implementations, the firmware code is compliant with UEFI PI standard based multi-phase boot up architecture.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A method for providing recovery from a boot up error in a computing device, comprising:
   executing a current unified extensible firmware interface (UEFI) BIOS;
   detecting the boot up error in the computing device;
   loading a plurality of recovery pre-EFI initialization modules (PEIMs) from a recovery UEFI BIOS for execution rather than from the current UEFI BIOS in a pre-EFI initialization (PEI) phase of a multi-phase platform initialization operation; and
   recovering from the boot up error by booting up the computing device using the plurality of recovery PEIMs loaded from the recovery UEFI BIOS.

2. The method of claim 1 wherein recovering from the boot up error further comprises executing a driver execution environment (DXE) from the recovery UEFI BIOS that performs handoff with the PEI phase that executes the plurality of recovery PEIMs.

3. The method of claim 1 wherein loading the plurality of recovery PEIMs comprises using a PEIM dispatcher of the current UEFI BIOS to call a PEI core service of the current UEFI BIOS to load the plurality of recovery PEIMs and execute the plurality of recovery PEIMs as part of the PEI phase.

4. The method of claim 1 wherein recovering from the boot up error further comprises performing post driver execution environment (DXE) boot phases from the recovery UEFI BIOS.

5. The method of claim 1 further comprising:
   detecting the boot up error by determining by the current UEFI BIOS that a recovery triggering event has occurred;
   loading the recovery UEFI BIOS into volatile memory of the computing device in response to the recovery triggering event; and
   checking by the current UEFI BIOS that the plurality of recovery PEIMs are present in the volatile memory prior to loading the plurality of recovery PEIMs.

6. The method of claim 1 wherein the current UEFI BIOS is configured to carry out PEI phase that employs the plurality of recovery PEIMs and a driver execution environment (DXE) phase of the recovery UEFI BIOS, and wherein the method includes overwriting the current UEFI BIOS with the recovery UEFI BIOS and executing a boot dev select (BDS) operation and a transient system load (TSL) operation from the recovery UEFI BIOS to boot an operating system of the computing device.

7. A computing device comprising:
    non-volatile memory comprising a current unified extensible firmware interface (UEFI) BIOS;
    a processor, in operative communication with the non-volatile memory, the processor operative to:
    execute the current UEFI BIOS;
    detect a boot up error with the current UEFI BIOS;
    load a plurality of recovery pre-EFI initialization modules (PEIMs) from a recovery UEFI BIOS for execution rather than from the current UEFI BIOS in a pre-EFI initialization (PEI) phase of a multi-phase platform initialization operation; and
    recover from the boot up error by booting up the computing device using the plurality of recovery PEIMs loaded from the recovery UEFI BIOS.

8. The computing device of claim 7 wherein the processor is operative to recover from the boot up error by executing a driver execution environment from the recovery UEFI BIOS that performs handoff with the PEI phase that executes the plurality of recovery PEIMs.

9. The computing device of claim 7 wherein the processor is operative to load the plurality of recovery PEIMs using a PEIM dispatcher of the current UEFI BIOS to call a PEI core service of the current UEFI BIOS to load the plurality of recovery PEIMs from volatile memory and execute the plurality of recovery PEIMs as part of the PEI phase.

10. The computing device of claim 7 wherein the processor is operative to recover from the boot up error by performing post driver execution environment (DXE) boot phases from the recovery UEFI BIOS.

11. The computing device of claim 7 wherein the processor is operative to:
    detect the boot up error by determining by the current UEFI BIOS that a recovery triggering event has occurred;
    load the recovery UEFI BIOS into volatile memory of the computing device in response to the recovery triggering event; and
    check by the current UEFI BIOS that the plurality of recovery PEIMs are present in the volatile memory prior to loading the plurality of recovery PEIMs.

12. The computing device of claim 7 wherein the current UEFI BIOS is configured to carry out the PEI phase that employs the plurality of recovery PEIMs and a driver execution environment (DXE) phase of the recovery UEFI BIOS.

13. The computing device of claim 12 wherein the current UEFI BIOS is overwritten with the recovery UEFI BIOS and a boot dev select (BDS) operation and a transient system load (TSL) operation are executed from the recovery UEFI BIOS to boot an operating system of the computing device.

14. A non-transitory storage medium comprising stored executable instructions therein that, when executed by a processor, causes the processor to:
    execute a current unified extensible firmware interface (UEFI) BIOS,
    detect a boot up error with the current UEFI BIOS;
    load a plurality of recovery pre-EFI initialization modules (PEIMs) from a recovery UEFI BIOS for execution rather than from the current UEFI BIOS in a pre-EFI initialization (PEI) phase of a multi-phase platform initialization operation; and
    recover from the boot up error by booting up a computing device using the plurality of recovery PEIMs loaded from the recovery UEFI BIOS.

15. The non-transitory storage medium of claim 14 wherein the stored executable instructions cause the processor to recover from the boot up error by executing a driver execution environment (DXE) from the recovery UEFI BIOS that performs handoff with the PEI phase that executes the plurality of recovery PEIMs.

16. The non-transitory storage medium of claim 14 wherein the stored executable instructions cause the processor to load the plurality of recovery PEIMs using a PEIM dispatcher of the current UEFI BIOS to call a PEI core service of the current UEFI BIOS to load the plurality of recovery PEIMs and execute the plurality of recovery PEIMs as part of the PEI phase.

17. The non-transitory storage medium of claim 14 wherein the stored executable instructions cause the processor to recover from the boot up error by performing post driver execution environment (DXE) boot phases from the recovery UEFI BIOS.

18. The non-transitory storage medium of claim 14 wherein the stored executable instructions cause the processor to:
    detect the boot up error by determining by the current UEFI BIOS that a recovery triggering event has occurred;
    load the recovery UEFI BIOS into volatile memory of the computing device in response to the recovery triggering event; and
    check by the current UEFI BIOS that the plurality of recovery PEIMs are present in the volatile memory prior to loading the plurality of recovery PEIMs.

19. The non-transitory storage medium of claim 14 wherein the stored executable instructions comprise firmware configured to operate as the current UEFI BIOS.

20. The non-transitory storage medium of claim 14 wherein the current UEFI BIOS is configured to carry out the pre-EFI initialization (PEI) phase that employs the plurality of recovery PEIMs and a driver execution environment (DXE) phase of the recovery UEFI BIOS, and wherein the current UEFI BIOS is overwritten with the recovery BIOS and a boot dev select (BDS) operation and a transient system load (TSL) operation are executed from the recovery UEFI BIOS to boot an operating system of the computing device.

* * * * *